United States Patent Office 3,393,183
Patented July 16, 1968

3,393,183
COPOLYMERS HAVING UNSATURATED SIDE
CHAINS PRODUCED THROUGH AN ESTER-
ACID INTERCHANGE OF POLYVINYL ESTER
Darrell D. Hicks, Louisville, Ky., and Donald W. Gaddie,
Racine, Wis., assignors, by mesne assignments, to Cel-
anese Coatings Company, a corporation of Delaware
No Drawing. Continuation-in-part of application Ser. No.
157,577, Dec. 6, 1961. This application Apr. 27, 1964,
Ser. No. 362,981
4 Claims. (Cl. 260—86.1)

This application is a continuation-in-part of application Ser. No. 157,577, filed Dec. 6, 1961, and now abandoned.

This invention pertains to the production of new and improved resinous compositions eminently suitable as binders for laminates, adhesives and the like, as well as varnishes, films, fibers, and similar compositions.

The new and improved resinous compositions of this invention are vinyl acetate, vinyl propionate or similar vinyl ester polymers which have been further reacted by a process permitting the introduction to the copolymer of pendant alpha, beta-ethylenically unsaturated substituents in place of the saturated acid portion of such ester polymers. These compositions are obtained by reacting a polymer such as polyvinyl acetate, or vinyl acetate co-ploymers, through an ester-acid interchange reaction, with certain alpha, beta-unsaturated acids, the acetate groups of the copolymer being replaced by, or interchanged with, the acyl group of the alpha, beta-unsaturated acid. Hence in essence, the compositions of the invention are alpha, beta-unsaturated acid esters of vinyl alcohol polymers.

The polymerizable ester polymers, having pendant ethylenically unsaturated acyl groups, prepared according to the present invention, have a structure comprising recurring units having the formula:

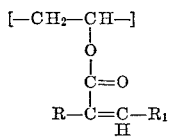

wherein R and $R_1$ are members of the group consisting of H and $CH_3$ and the combined number of carbon atoms of R and $R_1$ is no greater than 1.

Vinyl interchange involves the transfer of the vinyl group from an ester such as vinyl acetate to a carboxyl group of some acid or carboxy copolymer. Vinyl interchange reactions are generally catalyzed by the use of various mercury salts of strong acids as described in U.S. Serial No. 100,023, filed April 3, 1961 and now U.S. Patent 3,227,694. In ester-acid interchange reactions, as contemplated herein, acid catalysts are generally required rather than a mercury salt. However, a mineral acid is generally preferred under non-oxidizing conditions. Thus, for catalyzing ester-acid interchanges, various inorganic acids are employed, for example, phosphoric acid, sulfuric acid and the like. Also included are organic acids such as alkyl and aryl sulfonic acid and alkyl acid phosphate. Examples are benzene sulfonic acid, toluene sulfonic acid, propane sulfonic acid, butyl acid phosphate, propyl acid phosphate, etc.

These inorganic acid catalysts are usually employed as concentrated rather than dilute solutions. Only small amounts of these catalyst solutions need be used, as little as two weights percent or less, say 0.1 to 2 weight percent concentrated acid being desirable and effective based on the solution of the polymer and unsaturated acid.

The ester-acid interchange reaction can be effected at temperatures as low as room temperature up to the normal boiling point of the highest boiling constituent in the mixture which will be the solvent or the alpha, beta-unsaturated acid, the rate of conversion increasing as the temperature rises. A solvent with a boiling point above that of the saturated acid formed such as acetic acid, but below that of the unsaturated acid initially employed should be used and the temperature should be such that the saturated acid formed will be distilled out. It is preferred to carry out the reaction slightly above the boiling point of the resulting organic acid, generally around 130° C. to 140° C. For the interchange, the number of mols of unsaturated acid generally should not exceed the number of acid portions in the ester polymer, that is, acyl groups such as acetate or propionate to be interchanged therewith. Hereinafter, this acid portion will be termed "ester group." Thus, the number of mols of acid are approximately equal to the number of ester groups that are to be replaced. Generally, the number of mols of unsaturated acid employed will be preferably equal to the number of ester groups in the polymer.

Alpha, beta-unsaturated acid ester-vinyl alcohol polymers cannot be made by the usual method of polymerizing the ester monomer such as vinyl acrylate because this monomer contains two sets of double bonds leading to cross-linking. This invention, therefore, offers a new method for their preparation since the copolymer is already prepared using a monomer which will not cross-link. This copolymer is then reacted the unsaturated acid. Acids which can be used to advantage in the reaction with vinyl ester polymers are acrylic, methacrylic, and crotonic acids, that is, short chain alpha, beta-unsaturated mono-carboxylic acids, "short chain" meaning not more than four carbon atoms.

Since they are well known and are not the essence of the invention, polymers contemplated for use with the organic acid in the ester-acid interchange are homopolymers and copolymers of vinyl acetate, vinyl propionate and similar vinyl alcohol-short chain saturated organic acid esters, the organic acids having not more than five carbon atoms. A particularly desirable polymer is polyvinyl acetate itself. Other polymers of vinyl acetate can be used. However, it must be recognized that vinyl acetate is difficult to copolymerize with monomers other than acrylates, maleates, fumarates, crotonates, acrylonitrile and vinyl halides. Nevertheless, copolymers can be made by the use of special techniques, for example, block polymerization and two-stage processes such as grafting and the like. Realizing that these techniques can be used, vinyl acetate or propionate copolymers are available wherein the vinyl ester is combined with various monomers. Thus, such comonomers are saturated alcohol esters of acrylic, methacrylic, crotonic, and other mono-unsaturated monocarboxylic acids having not more than four carbon atoms and alcohols having not more than twenty carbon atoms. Acrylic, methacrylic, and crotonic acid esters of saturated alcohols include the methyl, ethyl, propyl, isopropyl, n-butyl, isobutyl, (sec butyl), (tert) butyl, amyl, hexyl, heptyl, octyl, decyl, dodecyl, etc. esters of acrylic, methacrylic acids and crotonic acids. Other comonomers include vinyl aliphatic cyanides of not more than four carbon atoms, for example, acrylonitrile and methacrylonitrile. Examples of other comonomers are styrene, vinyl toluene, alpha-methyl styrene, the halostyrenes, etc., each having a single vinyl group; isopropenyl toluene, the various dialkyl styrenes, ortho-, meta-, and para-chloro styrenes, bromo styrenes, fluoro styrenes, cyano styrenes, alpha-methyl styrenes, alpha-methyl para-methyl styrenes, as well as various di-, tri-, and tetra-chloro, bromo, and fluoro styrenes; and such monomers as vinyl chloride, vinyl bromide, and the like.

The vinyl acetate copolymers are prepared by well-known techniques, such as those mentioned hereinbefore, generally by mass, emulsion, or solution polymerization. Their preparation is separate from this invention. Solution polymerization involves heating the monomers in a solvent in the presence of a catalyst, e.g., a peroxide and more particularly an organic peroxide catalyst in accordance with the known methods. Suitable solvents are xylene and other aromatic hydrocarbon solvents, esters, ketones, and mixtures of hydrocarbons with esters and ketones. Catalysts include such peroxides as tertiary butyl hydroperoxide, benzoyl peroxide, acetyl peroxide, lauroyl peroxide, ditertiary butyl peroxide and others. Polymerization temperatures vary from 60° C. to 135° C., depending upon the method used. Similar conditions are employed in the case of mass polymerization, the copolymer being subsequently dissolved in a solvent.

To introduce the acrylate or crotonate groups through interchange with the acetate or other group, the vinyl acetate polymer, obtained as described hereinbefore or from any source, is reacted with acrylic, methacrylic, or crotonic acid. The reaction of the polymer and the unsaturated acid involves no particular difficulties, except that there will be a tendency for the unsaturated acid to polymerize if the reaction temperature is too high. Otherwise, the acid catalyst is merely added to the polymer-unsaturated acid mixture. In view of the tendency toward polymerization, it is frequently desirable to incorporate in this mixture one of the known polymerization inhibitors. Such inhibitors are well known, the phenolic inhibitors such as hydroquinone, benzoquinone, and the monomethyl ether of hydroquinone being preferred because they are inert in the acid medium. After these reactants are brought together, the mixture is then reacted at or near the reflux temperature of the system, say 120° C. to 150° C. As indicated hereinbefore, about one mol of the organic acid for each acetate group is preferred. It is understood, however, that more or less alpha, beta-unsaturated monocarboxylic acid can be used. For example, the number of mols of unsaturated acid can exceed the total number of ester groups present in the polymer. If this excess is used, it will be necessary in most instances to recover the excess before the interchanged polymer is used. For this reason, the number of mols of alpha, beta-unsaturated monocarboxylic acid employed conveniently is equal to the number of ester groups to be interchanged therewith. Since the vinyl acetate polymers will normally have been made in a solvent, the ester-acid interchange reaction can be carried out in the same solvent. The only criterion for this solvent is that it will not be reactive in the system. Thus, solvents such as alcohols and Cellosolves having hydroxyl groups will not be used because they would react with acid groups to form esters. Solvents which can be added, especially when the vinyl acetate polymer is made by another method, include acetone, methyl ethyl ketone, methyl isobutyl ketone, diisobutyl ketone, etc.; and aromatic hydrocarbon solvents such as xylene, toluene, benzene, etc., and mixtures of these solvents.

The conversion of acetate groups of the polymer to acrylate or crotonate groups in accordance with this invention can best be understood by reference to specific examples. These examples are for the purpose of illustration only and are not intended to place any limitations on the invention.

EXAMPLE 1

Materials: Parts by weight

Polyvinyl acetate solution
(49 percent solids in xylene) _____ 526.0
Crotonic acid _____ 86.0
Phosphoric acid (85 percent) _____ 1.0
Xylene _____ 300.0

In a one liter, three-neck, round-bottom flask equipped with thermometer and stirrer and fitted for distillation, a polyvinyl acetate copolymer having crotonate groups is prepared using the 49 percent solids solution of polyvinyl acetate (previously prepared by refluxing a vinyl acetate-benzoyl peroxide mixture at 90° C. for one hour, and the resulting solution having a viscosity (Gardner-Holdt) of Y). In this flask, the 86 parts of crotonic acid, 300 parts of xylene, 1.0 part of 85 percent phosphoric acid and 526 parts of the polyvinyl acetate solution are heated with agitation to 132° C. and held there for a period of twelve hours. At this temperature, acetic acid is being codistilled off with xylene. Additional xylene is added to the flask contents at the same rate as the solvent is distilled off. After twelve hours of distillation, 46.7 parts of acetic acid has been codistilled off with xylene. The resulting product is a 54.5 percent solids solution in xylene having an acid value (based on solids) of 54.7 and a solution acid value of 29.8. The final acid value indicates a 78 percent reaction.

EXAMPLE 2

| Material | Parts by Weight | Molar Ratio |
| --- | --- | --- |
| Polyvinyl acetate * | 344 | 4.0 |
| Methylisobutyl ketone | 500 | |
| Acrylic acid | 144 | 2.0 |
| p-Toluenesulfonic acid hydrate | 6 | 0.03 |

*Approximate molecular weight of 1,500-softening point (ball and ring) of 32° C.

The foregoing ingredients along with .36 part hydroquinone by weight are combined in a two liter flask equipped with glass stirrer and a condenser set for distillation. The acid value of this mixture is 118. The contents are distilled slowly over a period of fourteen hours adding solvent to replace that distilled off. A total of 73.1 parts of acetic acid is distilled over with solvent. To neutralize the catalyst, 10 parts of sodium bicarbonate and 3 parts of water are added. The mixture is filtered, the resulting product having an acid value of 5.8 (solution) and a percent solids of 31. The final acid value indicates a 92 percent reaction.

The following example shows that sulfuric acid rather than mercury interchange catalysts are desirable for this reaction.

EXAMPLE 3

An attempt was made to make a similar product using 310 parts by weight of a 49 percent solution of polyvinyl acetate and 77 parts by weight of methacrylic acid with a mercuric acetate catalyst. As a catalyst, 1.2 parts of mercuric acetate and 0.4 parts of fuming sulfuric acid (30 percent) were employed. As an inhibitor, 1.5 parts of hydroquinone were added. The catalyst-polyvinyl acetate-methacrylic acid mixture was then heated in a one liter flask at 80° C. for five hours. The catalyst was then neutralized with three parts of sodium bicarbonate. Only 18.6 parts of acetic acid were found in the distillate.

As pointed out hereinabove, the products prepared according to the present invention, which have a structure comprising recurring units of the formula described above, may be formed by reacting the vinyl ester homopolymer or copolymer with the alpha, beta-unsaturated acid. It is evident that when the homopolymer is employed, the structure of the resulting product will comprise successively recurring units. On the other hand, the use of a copolymer, containing intermittently recurring acyl groups, will result in the formation of a product having intermittently recurring alpha, beta ethylenically unsaturated substituents.

We claim:

1. A process for preparing polymerizable ester polymers having pendant ethylenically unsaturated acyl groups, which comprises, through an ester-acid interchange reaction replacing saturated acyl side chains of a vinyl alcohol-saturated organic acid ester polymer with polymerizable unsaturated aliphatic acyl side chains, each acyl group having not over four carbon atoms, said ester-acid interchange being accomplished by heating (a) a solution of the ester polymer with (b) a polymerizable $\alpha,\beta$-monoethylenically unsaturated monocarboxylic acid having not more than four carbon atoms in contact with, as a catalyst, an amount not exceeding two weight percent based on (a) and (b), sufficient to catalyze the reaction, of a strong acid, and at an elevated temperature below the polymerization temperature of said unsaturated acid, and the number of mols of alpha, beta-unsaturated acid being approximately equal to the number of ester groups to be replaced.

2. The process of claim 1 wherein the polymer is polyvinyl acetate and the monoethylenically unsaturated acid is acrylic acid.

3. The process of claim 1 wherein the polymer is polyvinyl acetate and the monoethylenically unsaturated acid is crotonic acid.

4. The process of claim 1 wherein the polymer is a vinyl acetate-ethyl acrylate copolymer and the monoethylenically unsaturated acid is methacrylic acid.

References Cited
UNITED STATES PATENTS

| | | | |
|---|---|---|---|
| 3,317,635 | 5/1967 | Osmond et al. | 260—881 |
| 3,296,225 | 1/1967 | Worrall | 260—87.3 |
| 3,004,851 | 10/1961 | Brown | 260—885 |
| 2,725,372 | 11/1955 | Minsk | 260—91.3 |
| 2,299,862 | 10/1942 | Toussaint et al. | 260—491 |
| 2,558,548 | 6/1957 | Eckey | 260—89.3 |
| 2,931,819 | 4/1960 | Mayne et al. | 260—476 |

OTHER REFERENCES

Shostakovskii et al., Izvest. Akad. Nauk. S.S.S.R. Otdel. Khim. Nauk., October 1961, pages 1890–1.

JOSEPH L. SCHOFER, *Primary Examiner.*

M. L. BERCH, M. B. KURTZMAN, *Assistant Examiners.*